No. 704,909.  
J. W. S. NYCUM.  
PIPE COUPLING.  
(Application filed Nov. 2, 1901.)  
Patented July 15, 1902.
(No Model.)
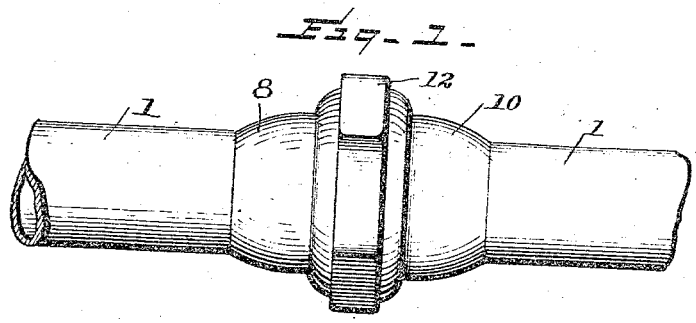
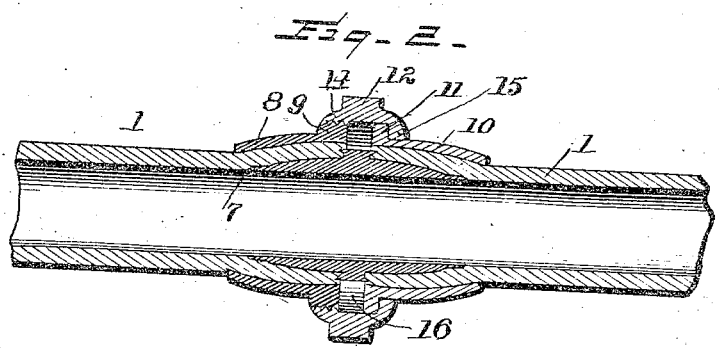
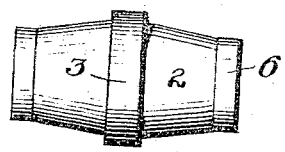
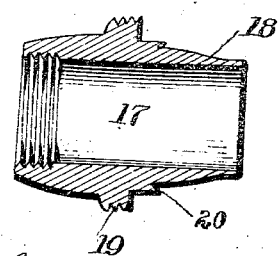
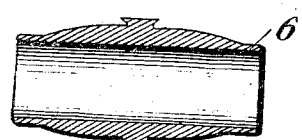
J.W.S. Nycum.  
Inventor

UNITED STATES PATENT OFFICE.

JOSEPH W. S. NYCUM, OF PITTSBURG, PENNSYLVANIA.

PIPE-COUPLING.

SPECIFICATION forming part of Letters Patent No. 704,909, dated July 15, 1902.

Application filed November 2, 1901. Serial No. 80,849. (No model.)

*To all whom it may concern:*

Be it known that I, JOSEPH W. S. NYCUM, a citizen of the United States of America, residing at Pittsburg, in the county of Allegheny and State of Pennsylvania, have invented certain new and useful Improvements in Pipe-Couplings, of which the following is a specification, reference being had therein to the accompanying drawings.

This invention relates to certain new and useful improvements in pipe-couplings, and has for its object to provide novel and efficient means whereby two sections of lead pipe may be easily and quickly joined together in a manner that leakage between the ends of the sections will be impossible.

The invention also aims to construct a coupler readily adaptable for connecting the sections of lead pipe to a section of iron, steel, or like metal pipe in a manner to prevent the leakage between the sections.

Briefly described, my invention comprises a connecting member substantially in the form of a double cone which is inserted in the flared ends of the pipe-sections and has an annular flange the two edges of which are grooved so that in cross-section the flange is substantially dovetailed. The two knife-edges formed by the grooving of the flange are adapted to embed themselves into the adjacent ends of the pipe-sections, and the latter are bound firmly upon the connecting member by means of sleeves and a ring-nut.

In describing the invention in detail reference is had to the accompanying drawings, forming a part of this specification, and wherein like numerals of reference indicate corresponding parts throughout the several views, in which—

Figure 1 is a side elevation of my improved coupling in position on the pipe. Fig. 2 is a longitudinal sectional view thereof. Fig. 3 is a detail plan view of the connecting cone member. Fig. 4 is a longitudinal sectional view of a modified form of cone members. Fig. 5 is a longitudinal sectional view of the cone member shown in Figs. 2 and 3.

In the accompanying drawings, 1 indicates the sections of lead pipe, and these sections of pipe before the coupling is made are flared at their ends to receive the interior connecting member 2, this connecting member 2 being substantially in the form of a double truncated cone, having formed on its periphery, midway of its ends, an annular flange 3. This flange 3 is grooved on the sides thereof, these grooves 4 projecting inwardly and downwardly toward the axis of the member, so that the central knife-edge 5 is formed on each side of the annular flange 3, the latter being substantially dovetailed in cross-section. The two cone members taper from the annular flange 3 to a point in close proximity to the ends of the member, so as to form the annular portion 6 of equal diameter throughout. These ends 6 in the cones are adapted, as the cones are wedged into the flaring or bell-shaped ends of the pipe-sections, to engage the connecting-pipe until the limit of their vertical travel is reached, when they will be seated in the pipes, as shown at 7, and the annular knife-edges 5 will be seated in the ends of the pipe-sections in a manner shown in Fig. 2 of the drawings. These flat annular portions 6 are adapted for use as a means for flaring the ends of the pipe-sections previous to the insertion of the cone member. Thus in operation one of the ends of the member 2 is placed into the end of the pipe, a block of wood is placed upon the opposite end of member 2 and the same subjected to a driving force, which will spread the end of the pipe. The member 2 is then withdrawn, and a similar operation is performed upon the end of the other pipe-section. When the cone member has thus been placed in position, the sleeve 8 is placed on one pipe-section, this sleeve having an annular threaded ring 9, and the sleeve 10 is placed on the opposite pipe-section, this sleeve having an annular flange 11, and the two sleeves, with the pipe-sections, are firmly drawn together by means of the ring-nut 12, having interior threads 14 to engage the threaded flange 9 and the flange 15 to engage the flange 11.

I desire to call particular attention to the fact that when the seal between the ends of the pipe-sections is effected, as shown in Fig. 2 of the drawings, the limit of movement between the pipe-sections has not been reached, as the ends of the pipe-sections are not in engagement, and a considerable space, as at 16, is between the annular flange 11 of the ring 10 and the flange 9 of the ring 8, so that further tightening of the ring-nut 12 will cause the knife-edges 5 to further embed into the ends of the pipe-sections, so as to spread the lead at the ends of these sections to form an absolutely tight seal.

In Fig. 4 I show a connecting member 17, which is adapted to be employed for connecting a section of lead pipe on to a section of iron, steel, or like pipe. This member 17 is interiorly screw-threaded at one end for engagement with the iron pipe and is cone-shaped at the other, as at 18, which end engages into the lead pipe in the same manner as the ends of the member 2. This member has an annular threaded flange 19 and an annular knife-edge 20, the latter being adapted to embed itself into the end of the lead pipe, where it is held by means of the sleeve and ring-nut in the same manner as is employed for joining two sections of lead pipe together.

Having fully described my invention, what I claim as new, and desire to secure by Letters Patent, is—

In a pipe-coupling, the combination with the flared ends of the pipe-sections having a space therebetween, of a double-cone connecting member having an annular flange with a flat periphery provided on each side with an inwardly-extending groove forming a knife-edge at the upper face of said flange, said knife-edges engaging into the pipe-sections, said cone member being tapered from said flange and carrying a portion at each end of equal diameter throughout, said portion adapted to spread the ends of the pipe-sections, a sleeve mounted on one pipe-section and provided with an annular flange, a sleeve mounted on the opposite pipe-section and provided with an annular threaded flange, said annular flanges having a space therebetween adapted to be occupied by the lead cut by the said knife-edge of the connecting member, a ring-nut having its threads engaging with said threaded flange, a flange carried by said ring-nut for engagement with said first-named sleeve-flange, substantially as described.

In testimony whereof I affix my signature in the presence of two witnesses.

JOSEPH W. S. NYCUM.

Witnesses:
 JOHN NOLAND,
 E. E. POTTER.